US008568908B2

(12) United States Patent
Hirata et al.

(10) Patent No.: US 8,568,908 B2
(45) Date of Patent: Oct. 29, 2013

(54) METHOD FOR MANUFACTURING MAGNETIC FILM AND MAGNETIC FILM

(75) Inventors: Kei Hirata, Tokyo (JP); Atsushi Yamaguchi, Tokyo (JP); Shingo Miyata, Tokyo (JP)

(73) Assignee: TDK Corporation, Tokyo (JP)

( * ) Notice: Subject to any disclaimer, the term of this patent is extended or adjusted under 35 U.S.C. 154(b) by 343 days.

(21) Appl. No.: 11/765,069

(22) Filed: Jun. 19, 2007

(65) Prior Publication Data
US 2008/0070064 A1 Mar. 20, 2008

(30) Foreign Application Priority Data
Sep. 15, 2006 (JP) ................................. 2006-251390

(51) Int. Cl.
*G11B 5/33* (2006.01)

(52) U.S. Cl.
USPC .......................................... 428/812; 360/110

(58) Field of Classification Search
USPC ............................................... 428/800–848.9
See application file for complete search history.

(56) References Cited

U.S. PATENT DOCUMENTS

| 6,538,845 B1 * | 3/2003 | Watanabe et al. ........ 360/125.43 |
| 2002/0048695 A1 * | 4/2002 | Sakawaki et al. ........ 428/694 TS |
| 2002/0163767 A1 * | 11/2002 | Terunuma ................. 360/324.12 |
| 2003/0104251 A1 * | 6/2003 | Shimizu et al. ........ 428/694 MM |
| 2003/0219630 A1 * | 11/2003 | Moriwaki et al. ........ 428/694 R |
| 2004/0085685 A1 * | 5/2004 | Shiroishi ........................ 360/317 |
| 2004/0086752 A1 * | 5/2004 | Matsukawa et al. .......... 428/692 |
| 2005/0003234 A1 | 1/2005 | Ikeda et al. |
| 2005/0053803 A1 * | 3/2005 | Umeda et al. .............. 428/694 T |
| 2005/0208340 A1 * | 9/2005 | Oikawa et al. ................ 428/829 |
| 2007/0026260 A1 * | 2/2007 | Nemoto et al. ............... 428/831 |
| 2007/0026262 A1 * | 2/2007 | Maeda ........................ 428/831.2 |
| 2007/0111035 A1 * | 5/2007 | Shimizu et al. ............. 428/828.1 |
| 2008/0137236 A1 * | 6/2008 | Lee et al. ................. 360/324.11 |

FOREIGN PATENT DOCUMENTS

| JP | 07- 57934 | 3/1995 |
| JP | 2002-230716 | 8/2002 |
| JP | 2005-25890 | 1/2005 |
| JP | 2005-86012 | 3/2005 |
| JP | 2007-184022 | 7/2007 |

OTHER PUBLICATIONS

Machine English Translation: Shinoura et al. JP 04-229607 (1992).
Abstract and Derwent Abstract from East.*
Venkatraman et al., The Cr-Pt (Chromium-Platinum) System, 1990, Bulletin of Alloy Phase Diagrams, vol. 11, 16-21.*
Murray, The Pt-Ti (Platinum-Titanium) System, 1982, Bulletin of Alloy Phase Diagrams, vol. 3 No. 3, 329-335.*
Murray, The Pd-Ti (Palladium-Titanium) System, 1982, Bulletin of Alloy Phase Diagrams, vol. 3 No. 3, 321-329.*

* cited by examiner

*Primary Examiner* — Holly Rickman
*Assistant Examiner* — Linda Chau
(74) *Attorney, Agent, or Firm* — Oblon, Spivak, McClelland, Maier & Neustadt, L.L.P.

(57) ABSTRACT

A method for manufacturing a magnetic film includes preparing a foundation layer containing a noble metal element and a base metal element, and depositing a plated layer of a magnetic material on the foundation layer by pulse plating.

2 Claims, 6 Drawing Sheets

METHOD FOR MANUFACTURING MAGNETIC FILM AND MAGNETIC FILM

BACKGROUND OF THE INVENTION

1. Field of the Invention

The present invention relates to a method for manufacturing a plated magnetic film, for example for use in a magnetic head, and the magnetic film.

2. Description of the Related Art

In magnetic heads, a magnetic film having a magnetic layer of a magnetic material such as FeCo or NiFe layered on a foundation layer is used as a write pole, yoke or shield. In magnetic films of this type, decrease in coercivity and increase in permeability can be achieved at the same time by making the foundation layer of a noble metal such as Ru. For example, Japanese Unexamined Patent Application Publication No. 2005-25890 discloses in paragraph 0016 a structure having a magnetic layer of FeCo layered on a foundation layer of Ru.

SUMMARY OF THE INVENTION

In practice, the magnetic layer is formed to have a large thickness, for example, 0.2 μm or more. Plating is effective as a process of forming the magnetic film, in which the magnetic layer is deposited on the foundation layer by applying a current with the foundation layer immersed in a plating solution. Particularly preferred is pulse plating which applies a current of a pulse waveform. Pulse plating is expected to achieve a thick and dense magnetic layer because its intermittent plating with a pulse-like current waveform can suppress the growth of crystal grain while ensuring the thickness of the magnetic layer.

Based on the above, the present inventors have deposited a plated layer of a magnetic material on a foundation layer of a noble metal by pulse plating, but there were a problem of pinhole due to air bubbles taken in the plated layer and a problem of corrosion due to difference in potential.

The present invention has been devised to solve the above-mentioned problem and has an object to provide a method for manufacturing a magnetic film and a magnetic film which can suppress the occurrence of pinhole due to pulse plating while improving soft magnetic properties.

To achieve the above object, the present invention provides a method for manufacturing a magnetic film, comprising: preparing a foundation layer containing a noble metal element and a base metal element; and depositing a plated layer of a magnetic material on said foundation layer by pulse plating.

The present inventors have investigated the occurrence of pinhole due to pulse plating and, although without absolute certainty, understood the mechanism as follows.

In pulse plating, specifically, first periods in which a plated layer grows and second periods in which the plated layer stops growing or is etched alternate with each other in an extremely short period of time. If a foundation layer is made only of a noble metal and therefore has a high standard electrode potential, the high standard electrode potential of the foundation layer itself is added to a voltage applied to the foundation layer during the second period, resulting in that the potential of the foundation layer has a positive value higher than the intended value. Hence, the plating solution is decomposed around the foundation layer to generate air bubbles such as oxygen gas. When the plated layer grows during the subsequent first period, then, the air bubbles are taken into the plated layer to cause pinholes.

In addition, it is generally known that since the magnetic film is made of a metal having a less noble potential (or a lower potential than a noble metal), a difference in potential with a noble metal causes corrosion due to a battery effect.

In the present invention, accordingly, there is adopted a foundation layer containing a noble metal element and a base metal element. Since this foundation layer has a lower standard electrode potential than a foundation layer only of a noble metal, the occurrence of pinhole or corrosion in the plated layer can be suppressed during pulse plating.

Moreover, since the above foundation layer contains a noble metal element, the plated layer of a magnetic material formed on the foundation layer has excellent soft magnetic properties.

The present invention also provides a magnetic film comprising a foundation layer containing a noble metal element and a base metal element and a plated layer of a magnetic material formed on the foundation layer.

In the magnetic film according to the present invention, since the foundation layer contains a noble metal element and a base metal element, it has a low standard electrode potential. Since the plated layer is formed on the foundation layer, accordingly, the occurrence of pinhole in the plated layer can be suppressed although the plated layer is deposited by pulse plating.

In addition, since the foundation layer contains a noble metal element, the plated layer of a magnetic material can be improved in soft magnetic properties.

The present invention further provides a thin-film magnetic head using the above magnetic film.

As has been described above, the present invention can provide a method for manufacturing a magnetic film which can suppress the occurrence of pinhole due to pulse plating while improving soft magnetic properties, and a magnetic film.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
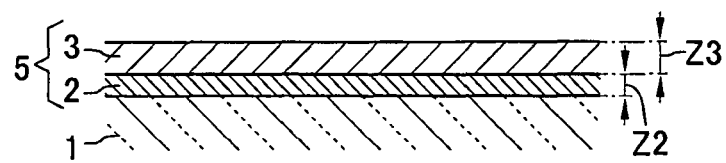
FIG. 1 is a sectional view showing a magnetic film according to one embodiment of the present invention.

Referring to FIG. 1, a magnetic film 5 includes a foundation layer 2 and a plated layer 3 and is formed on a substrate 1. The substrate 1 is made of, for example, a ceramic material such as AlTiC($Al_2O_3$.TiC).

The foundation layer 2 is formed on the upper surface of the substrate 1 to have a thickness Z2 of, for example, approximately 20 to 100 nm. The foundation layer 2 is made of an alloy material containing a noble metal and a base metal. The noble metal for use in the alloy material may be one or more elements selected from the group consisting of Cu, Ru, Rh, Pd, Ag, Re, Ir, Pt and Au. On the other hand, the base metal is preferably a non-magnetic base metal and, for example, may be one or more elements selected from the group consisting of Ti, V, Cr, Zr, Nb and Mo. The noble metal and the base metal may be arbitrarily combined. For example, Ru and Cr may be combined. In addition, the addition amount of the base metal to the noble metal preferably ranges from 5 to 50 at. %, more preferably ranges from 5 to 20 at. %.

The foundation layer 2 preferably has a standard electrode potential of −1.00 to 0.70 V. The standard electrode potential of the foundation layer 2 can be adjusted by selecting an appropriate combination of the noble metal element and the base metal element for the alloy material or an appropriate addition amount of the base metal to the noble metal.

The plated layer 3 is formed on the upper surface of the foundation layer 2. In detail, the plated layer 3 is directly adhered to the upper surface of the foundation layer 2 to have a thickness Z3 of, for example, approximately 0.3 to 3.0 μm. The plated layer 3 is made of a magnetic material. Examples of the magnetic material include FeCo and NiFe. The plated layer 3, into which impurities such as sulfur and boron in a plating solution are incorporated, can be distinguished from layers formed by other methods, such as vacuum evaporation coating and sputtering.

According to another embodiment, a second plated layer of a magnetic material may be formed on the plated layer 3. If the magnetic material of the plated layer 3 is FeCo, for example, the magnetic material of the second plated layer may be NiFe.

After subjected to required processes such as etching, the above magnetic film 5 may be used as a write pole, yoke or shield of a magnetic head.

Next will be described a method for manufacturing the magnetic film 5 with reference to FIGS. 2 and 3.

Figure 2:
FIG. 2 is a view showing a step of a method for manufacturing a magnetic film according to one embodiment of the present invention.
Figure 3:
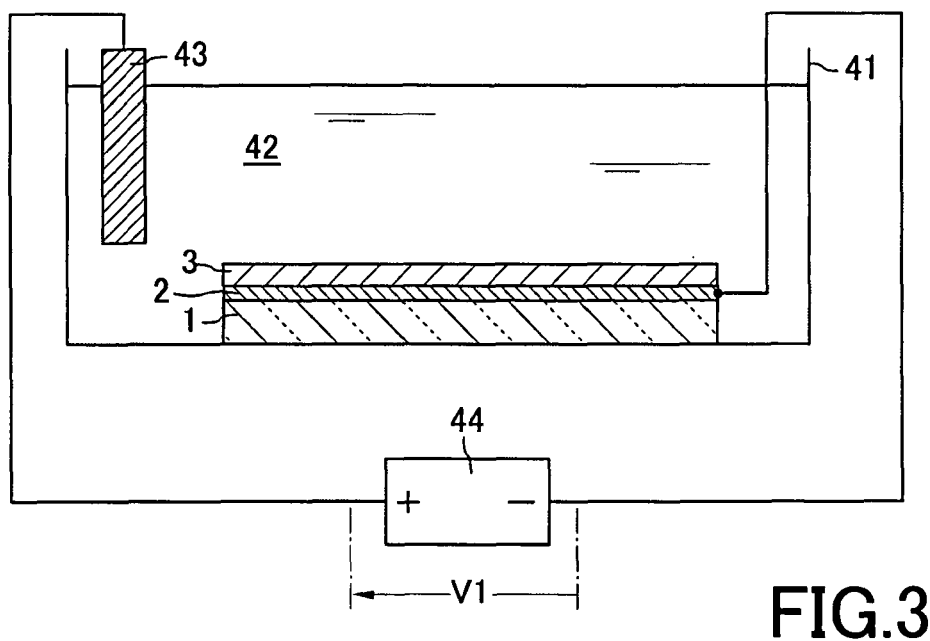
FIG. 3 is a view showing a step after the step shown in FIG. 2.

At first, as shown in FIG. 2, the foundation layer 2 is formed on the upper surface of the substrate 1. As described above, the foundation layer 2 is made of an alloy material containing a noble metal and base metal. The foundation layer 2 may be formed by vacuum evaporation coating, sputtering or plating.

Then, plating is performed to form a plated layer on the upper surface of the foundation layer 2. The plating process is shown in FIG. 3. Referring to FIG. 3, a plating solution 42 is in a plating bath 41. Components of the plating solution 42 are determined depending on the composition of the plated layer to be formed. When a CoFe plated layer is to be formed, for example, the plating solution 42 is prepared to contain Co ion and Fe ion. The source of Co ion supply may be cobalt sulfate or cobalt chloride, while the source of Fe ion supply may be iron sulfate or iron chloride. An electrode plate 43 is connected to a power supply 44.

The substrate 1 with the foundation layer 2 formed thereon is immersed in the plating solution 42 and then the foundation layer 2 is subjected to pulse plating. The specific procedure of pulse plating is such that after the foundation layer 2 is immersed in the plating solution 42, the electrode plate 43 and the foundation layer 2 are connected to the positive and negative electrodes, respectively, of the power supply 44 to apply a voltage V1 of a pulse-like waveform to the electrode plate 43.

Figure 4:
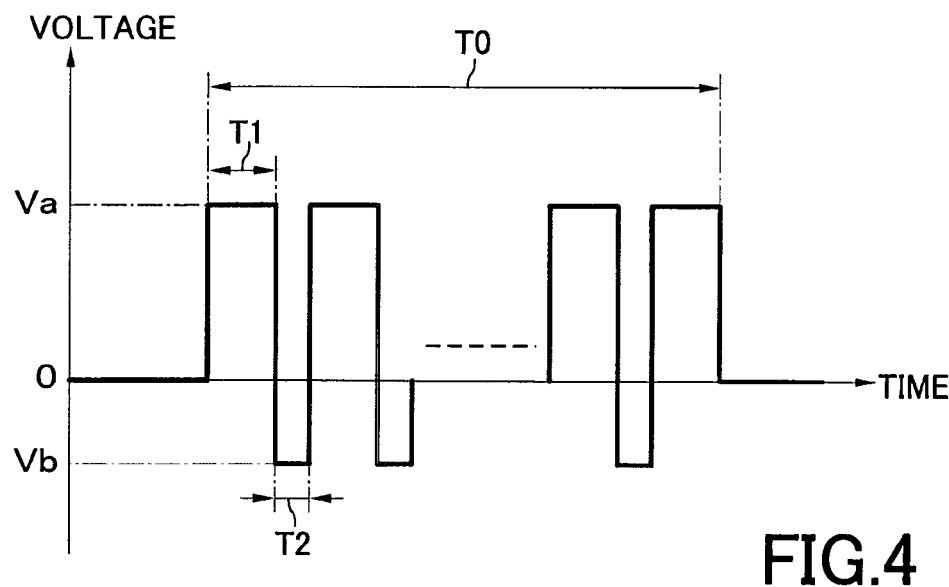
FIG. 4 is a diagram showing an exemplary voltage waveform for pulse plating.

An exemplary waveform of the voltage V1 is shown in FIG. 4. It should be noted that in FIG. 4, time is taken as abscissa and voltage is as ordinate. Referring to FIGS. 3 and 4, at first, a constant positive voltage Va is applied to the electrode plate 43 during a first period T1. This means that a constant negative voltage is applied to the foundation layer 2, which results in growing the plated layer 3 on the foundation layer 2. The length of the first period T1 is set, for example, from approximately 5 to 1000 ms. In addition, although depending on the composition of the plated layer to be formed, the magnitude of the plating current upon application of the positive voltage Va is set, for example, from approximately 0.01 to 0.1 A/cm$^2$.

Subsequently, a constant negative voltage Vb is applied to the electrode plate during a second period T2. This means that the applied voltage to the foundation layer 2 becomes positive, which results in etching the plated layer 3. The magnitude of the negative voltage Vb is smaller than the magnitude of the positive voltage Va. The ratio T2/T1 of the length of the second period T2 to the length of the first period T1 is set, for example, from approximately 1 to 200. In addition, although depending on the magnitude of the plating current upon application of the positive voltage Va, the magnitude of the plating current upon application of the negative voltage Vb is set, for example, from approximately 0 to 0.03 A/cm$^2$.

The first and second periods T1, T2 alternate with each other during a given period T0 to suppress the growth of crystal grain while ensuring the thickness of the plated layer 3.

With reference to the waveform in FIG. 4, a hypothetical case where the foundation layer 2 is made only of a noble metal and therefore has a high standard electrode potential will be described below. In this case, the high standard electrode potential of the foundation layer itself is added to a positive voltage applied to the foundation layer 2 during the second period T2, resulting in that the potential of the foundation layer 2 has a positive value higher than the intended value. Hence, the plating solution 42 is decomposed around the foundation layer 2 to generate air bubbles such as oxygen gas. When the plated layer 3 grows during the subsequent first period T1, then, the air bubbles are taken into the plated layer 3 to cause the problem of pinholes.

Figure 5:
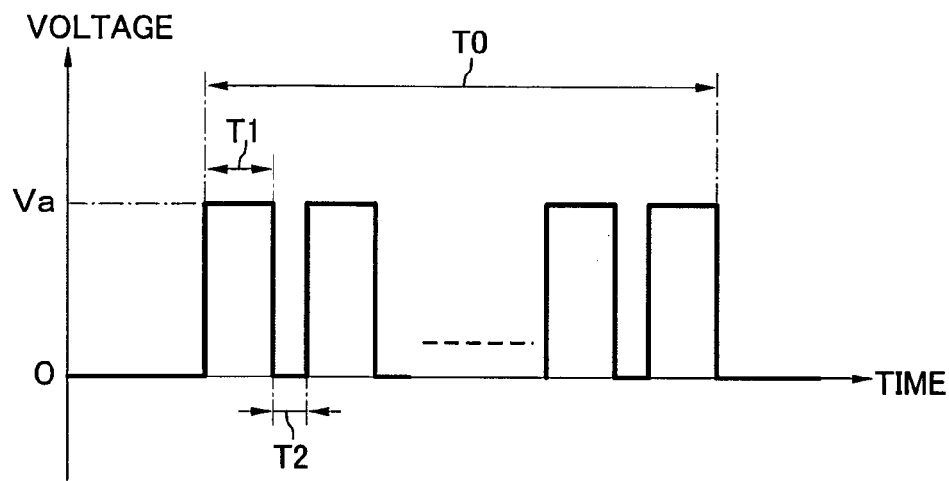
FIG. 5 is a diagram showing another exemplary voltage waveform for pulse plating.

Another exemplary waveform of the voltage V1 is shown in FIG. 5. As in the waveform shown in FIG. 4, at first, the constant positive voltage Va is applied to the electrode plate 43 during the first period T1.

Subsequently, the applied voltage to the electrode plate 43 becomes zero during the second period T2. This means that the applied voltage to the foundation layer 2 becomes zero, which results in stopping the growth of the plated layer 3. As in the waveform in FIG. 4, the first and second periods T1, T2 alternate with each other.

If the foundation layer 2 were made only of a noble metal, the plated layer 3 might have a problem of pinhole also in the waveform in FIG. 5. More specifically, if the foundation layer 2 has a high standard electrode potential, the high standard electrode potential of the foundation layer itself is added even though the applied voltage to the foundation layer 2 is zero. Thus, the potential of the foundation layer 2 has a positive value higher than the intended value, causing pinholes in the plated layer 3.

Figure 6:
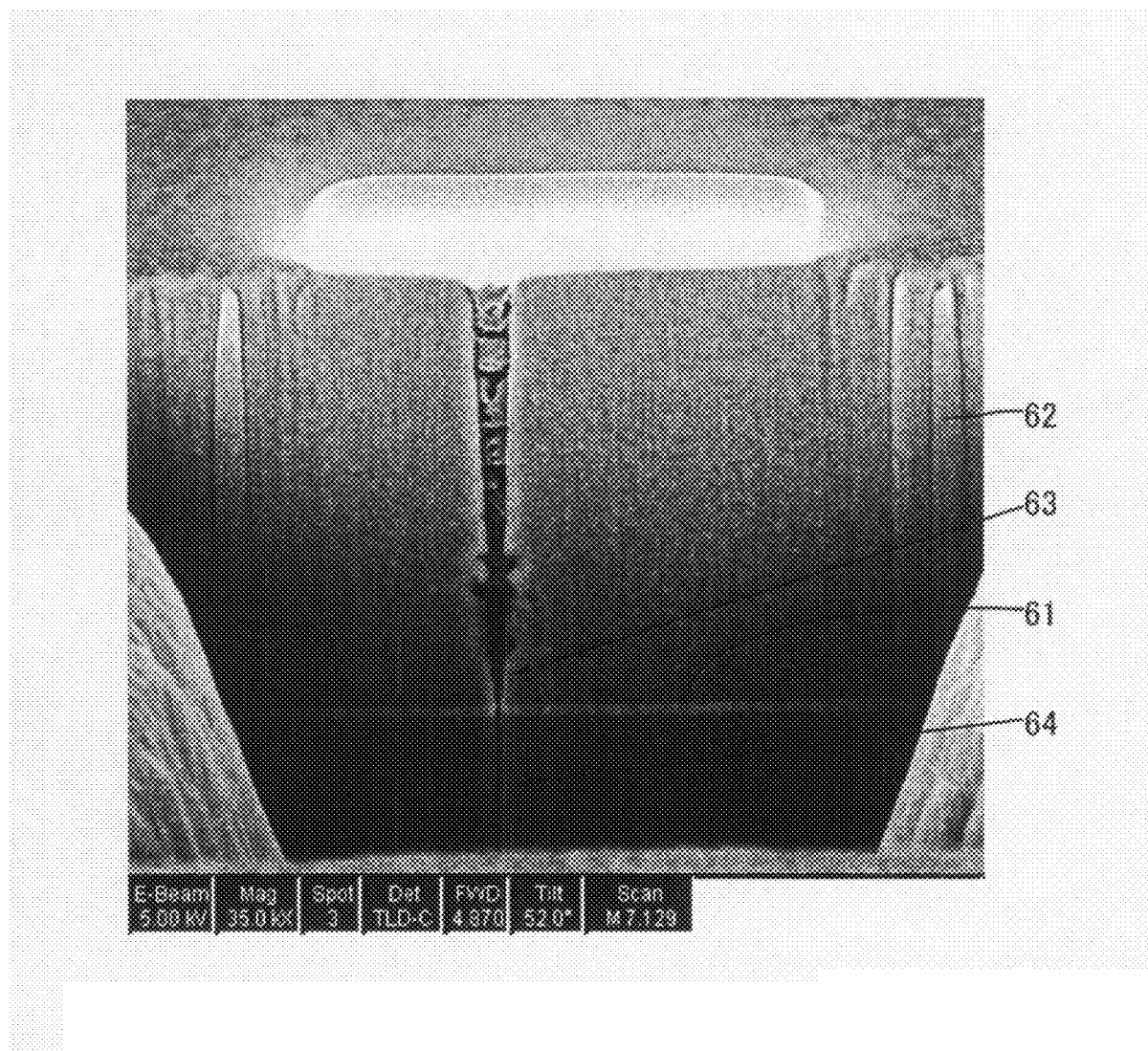
FIG. 6 is a cross-sectional photograph showing a state of a plated layer, in which pulse plating is performed on a foundation layer only of a noble metal.

FIG. 6 is a cross-sectional photograph showing a state of a plated layer, in which pulse plating is performed on a foundation layer only of a noble metal. In FIG. 6, a plated layer 62 deposited on a foundation layer 61 has a pinhole 63 and it is seen that the plated layer 62 does not grow above the pinhole 63. It should be noted that a line 64 is not a pinhole or corrosion but is a line caused by the effect of the pinhole 63 on a FIB (focused ion beam) process.

Referring again to FIG. 3, the present inventors have adopted the foundation layer 2 made of an alloy material containing a noble metal and a base metal as means for suppressing the occurrence of pinhole due to pulse plating. The foundation layer 2 has a low standard electrode potential as compared with a foundation layer only of a noble metal. Therefore, the occurrence of pinhole in the plated layer 3 can be suppressed even when the foundation layer 2 is subjected to pulse plating, thereby achieving a thick and dense plated layer 3.

Moreover, since the foundation layer 2 contains a noble metal, the plated layer 3 of a magnetic material can be improved in soft magnetic properties.

It is also found from the inventor's investigation that such a high standard electrode potential of the foundation layer 2 causes another problem, i.e., corrosion. In detail, if the foundation layer 2 has a high standard electrode potential, the standard electrode potential of the foundation layer 2 and the standard electrode potential of the plated layer 3 differ greatly from each other. Accordingly, when the foundation layer 2 and the plated layer 3 are exposed to a plating solution or an etchant at a step after the step shown in FIG. 3, corrosion due to a battery effect occurs between the foundation layer 2 and the plated layer 3.

Figure 7:
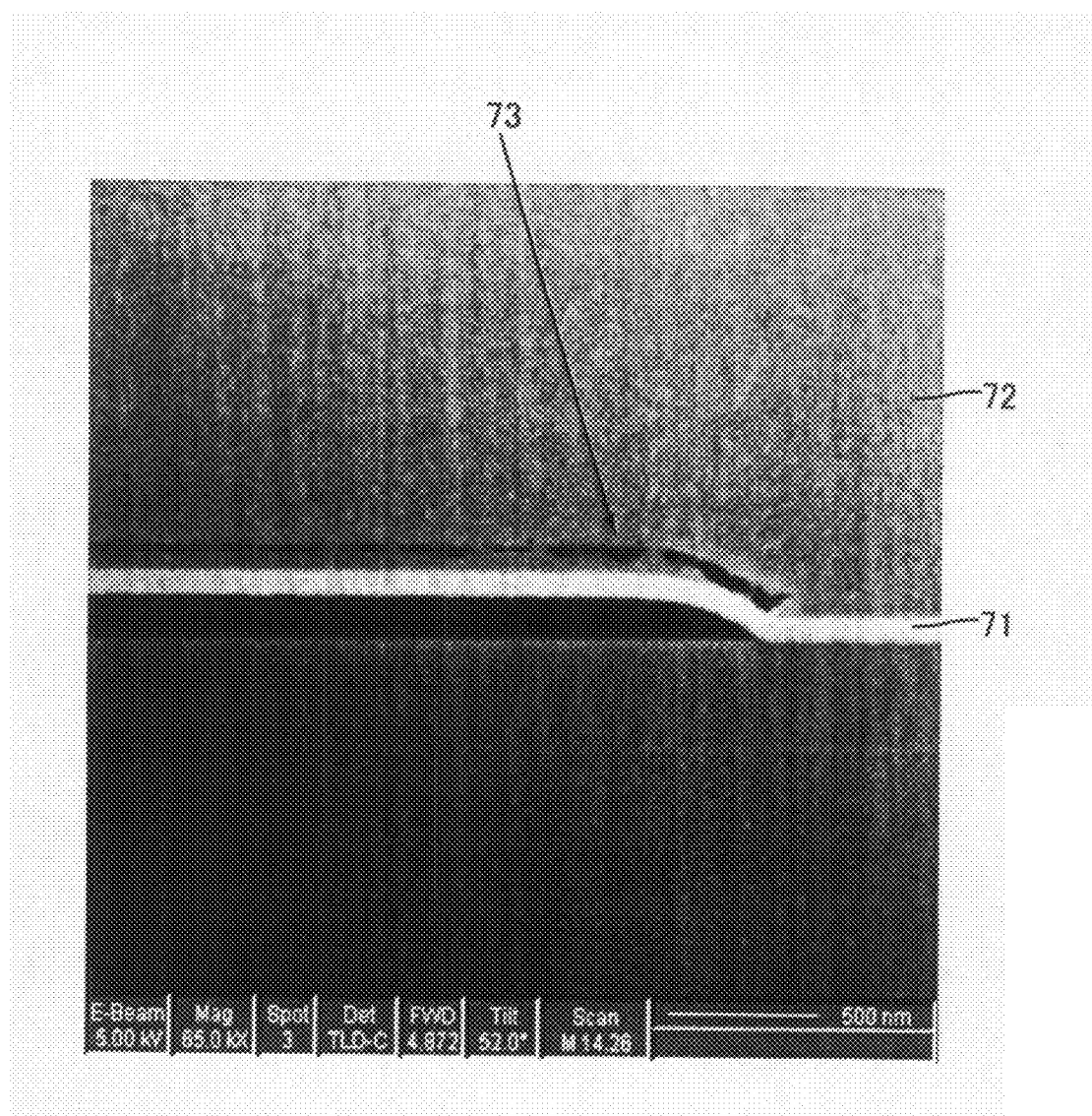
FIG. 7 is a cross-sectional photograph showing a state of a foundation layer and a plated layer, in which pulse plating is performed on a foundation layer only of a noble metal.

FIG. 7 is a cross-sectional photograph showing a state of a foundation layer and a plated layer, in which pulse plating is performed on a foundation layer only of a noble metal. It is seen from FIG. 7 that corrosion 73 occurs after pulse plating at a position between a foundation layer 71 and a plated layer 72.

In connection with the corrosion problem, as described with reference to FIG. 3, the standard electrode potential of the foundation layer 2 can be decreased to reduce the difference between the standard electrode potential of the foundation layer 2 and the standard electrode potential of the plated layer 3. This avoids the corrosion due to a battery effect.

According to another embodiment, a second plated layer of a magnetic material may be deposited on the plated layer 3 by subjecting the plated layer 3 to plating after deposition (FIG. 3) of the plated layer 3 on the foundation layer 2. Plating for deposition of the second plated layer may be the above pulse plating or ordinary plating in which a constant voltage or current is applied.

Next will be described prevention of occurrence of pinhole and corrosion and improvement in soft magnetic properties with reference to experimental data.

<Experiment 1>

At first, a foundation layer was formed on a substrate of AlTiC by sputtering. The foundation layer had a Rh-based composition into which Cr was added. The addition amount of Cr to Rh ranged from 0 to 100 at. %. The film thickness of the foundation layer was 20 nm.

Then, the foundation layer was subjected to pulse plating to form a plated layer directly on the foundation layer. The composition of the plated layer was Fe75Co25, and the film thickness of the plated layer was 1.0 μm. Thus, a magnetic film having a layered structure of the foundation layer and the plated layer was obtained.

The obtained magnetic film was then measured for soft magnetic properties. Concretely, the easy-axis coercivity Hc (Oe) and the permeability μ' at 10 MHz were measured.

Moreover, the crystal structure of the foundation layer and the impurity content (wt. %) of the plated layer were analyzed. The impurity content of the plated layer was obtained by quantitatively determining the elements of the plated layer with glow-discharge mass spectrometry (GD-MS) and calculating the total amount of the elements considered as impurities (chlorine, sulfur and oxygen).

Furthermore, the presence of pinhole and corrosion was determined. The experimental results are show in Table 1.

TABLE 1

| Sample No. | Cr addition amount in foundation layer (at. %) | Easy-axis coercivity Hc (Oe) | Permeability μ' (at 10 MHz) | Crystal structure of foundation layer | Impurity content of plated layer (wt. %) | Pinhole/corrosion |
| --- | --- | --- | --- | --- | --- | --- |
| 1 | 0 | 15 | 1540 | hcp | 0.71 | Yes |
| 2 | 2 | 15 | 1540 | hcp | 0.61 | Yes |
| 3 | 5 | 14 | 1540 | hcp | 0.43 | No |
| 4 | 8 | 16 | 1500 | hcp | — | No |
| 5 | 10 | 18 | 1420 | hcp | — | No |
| 6 | 15 | 21 | 1380 | hcp | — | No |
| 7 | 20 | 24 | 1240 | hcp | 0.37 | No |
| 8 | 30 | 25 | 1050 | hcp | — | No |
| 9 | 40 | 26 | 850 | hcp | — | No |
| 10 | 45 | 28 | 790 | hcp-bcc | — | No |
| 11 | 50 | 32 | 620 | hcp-bcc | 0.236 | No |
| 12 | 55 | 38 | 490 | bcc | — | No |
| 13 | 60 | 45 | 450 | bcc | — | No |
| 14 | 80 | 52 | 400 | bcc | — | No |
| 15 | 100 | 60 | 320 | bcc | 0.175 | No |

In the item of "crystal structure of foundation layer" in Table 1, "hcp" refers to hexagonal close-packed structure, "bcc" refers to body-centered cubic structure, and "hcp-bcc" refers to a mixture of hexagonal close-packed structure and body-centered cubic structure.

At first, the occurrence of pinhole and corrosion will be discussed. The occurrence of pinhole and corrosion is susceptible to not only the standard electrode potential of the foundation layer but also the amount of impurities incorporated into the plated layer. In detail, the plating solution contains gas such as chlorine, sulfur and oxygen. When pulse plating is performed on a foundation layer into which only a small amount of Cr is added, much gas is generated and taken in the plated layer as impurities. The impurities in the plated layer lead to the occurrence of pinhole and corrosion.

When the Cr addition amount was less than 5 at. %, the standard electrode potential of the foundation layer was high, and at the same time, the impurity amount of the plated layer was large. Thus, either pinhole or corrosion occurred (Sample Nos. 1 and 2).

When the Cr addition amount was equal to or greater than 5 at. %, on the other hand, the standard electrode potential of the foundation layer was low, and at the same time, the impurity amount of the plated layer was small. Thus, both pinhole and corrosion were suppressed (Sample Nos. 3 to 15).

From the viewpoint of preventing pinhole and corrosion, accordingly, it is understood that the Cr addition amount is preferably equal to or greater than 5 at. %.

Next will be discussed soft magnetic properties such as easy-axis coercivity and permeability. When the Cr addition amount was equal to or less than 50 at. %, the hexagonal close-packed structure (hcp), which is a crystal structure of the noble metal Rh, was predominant in the crystal structure of the foundation layer. This ensured excellent soft magnetic properties, e.g., the easy-axis coercivity was less than 40 (Oe) and the permeability was greater than 600 (Sample Nos. 1 to 11).

When the Cr addition amount was greater than 50 at. %, on the other hand, the body-centered cubic structure (bcc), which is a crystal structure of the base metal Cr, was predominant in the crystal structure of the foundation layer. This deteriorated soft magnetic properties, e.g., the easy-axis coercivity was greater than 40 (Oe) and the permeability was less than 600 (Sample Nos. 12 to 15).

From the viewpoint of ensuring excellent soft magnetic properties, accordingly, it is understood that the Cr addition amount is preferably equal to or less than 50 at. %.

From the above, it is found that the Cr addition amount preferably ranges from 5 to 50 at. % in order not only to prevent pinhole and corrosion but also to ensure excellent soft magnetic properties. In order to further improve soft magnetic properties, more preferably, the Cr addition amount ranges from 5 to 20 at. %.

<Experiment 2>

To avoid duplication, the portions of the experiment 2 corresponding to the foregoing experiment 1 will not be described below. In the experiment 2, the foundation layer had a Pd-based composition into which Ti was added. The addition amount of Ti to Pd ranged from 0 to 100 at. %. The composition of the plated layer was Fe75Co25 as in the foregoing experiment 1.

The experimental results are shown in Table 2. It should be noted that the impurity amount (wt. %) of the plated layer was not analyzed in the experiment 2.

TABLE 2

| Sample No. | Ti addition amount in foundation layer (at. %) | Easy-axis coercivity Hc (Oe) | Permeability μ' (at 10 MHz) | Crystal structure of foundation layer | Pinhole/corrosion |
|---|---|---|---|---|---|
| 16 | 0 | 12 | 1600 | fcc | Yes |
| 17 | 2 | 15 | 1540 | fcc | Yes |
| 18 | 5 | 14 | 1540 | fcc | No |
| 19 | 8 | 16 | 1490 | fcc | No |
| 20 | 10 | 18 | 1410 | fcc | No |
| 21 | 15 | 20 | 1250 | fcc | No |
| 22 | 20 | 22 | 1200 | fcc | No |
| 23 | 30 | 26 | 1100 | fcc | No |
| 24 | 40 | 26 | 840 | fcc | No |
| 25 | 45 | 30 | 650 | fcc-hcp | No |
| 26 | 50 | 34 | 600 | fcc-hcp | No |
| 27 | 55 | 42 | 480 | hcp | No |
| 28 | 60 | 49 | 450 | hcp | No |
| 29 | 80 | 55 | 400 | hcp | No |
| 30 | 100 | 62 | 300 | hcp | No |

In the item of "crystal structure of foundation layer" in Table 2, "fcc" refers to face-centered cubic structure, "hcp" refers to hexagonal close-packed structure, and "fcc-hcp" refers to a mixture of face-centered cubic structure and hexagonal close-packed structure.

At first, the occurrence of pinhole and corrosion will be discussed. When the Ti addition amount was less than 5 at. %, either pinhole or corrosion occurred. This may be because the standard electrode potential of the foundation layer was high, and at the same time, the impurity amount of the plated layer was large (Sample Nos. 16 and 17).

When the Ti addition amount was equal to or greater than 5 at. %, on the other hand, both pinhole and corrosion were suppressed. This may be because the standard electrode potential of the foundation layer was low, and at the same time, the impurity amount of the plated layer was small (Sample Nos. 18 to 30).

From the viewpoint of preventing pinhole and corrosion, accordingly, it is understood that the Ti addition amount is preferably equal to or greater than 5 at. %.

Next will be discussed soft magnetic properties such as easy-axis coercivity and permeability. When the Ti addition amount was equal to or less than 50 at. %, the face-centered cubic structure, which is a crystal structure of the noble metal Pd, was predominant in the crystal structure of the foundation layer. This ensured excellent soft magnetic properties, e.g., the easy-axis coercivity was less than 40 (Oe) and the permeability was greater than 600 (Sample Nos. 16 to 26).

When the Ti addition amount was greater than 50 at. %, on the other hand, the hexagonal close-packed structure, which is a crystal structure of the base metal Ti, was predominant in the crystal structure of the foundation layer. This deteriorated soft magnetic properties, e.g., the easy-axis coercivity was greater than 40 (Oe) and the permeability was less than 600 (Sample Nos. 27 to 30).

From the viewpoint of ensuring excellent soft magnetic properties, accordingly, it is understood that the Ti addition amount is preferably equal to or less than 50 at. %.

From the above, it is found that the Ti addition amount preferably ranges from 5 to 50 at. % in order not only to prevent pinhole and corrosion but also to ensure excellent soft magnetic properties. In order to further improve soft magnetic properties, more preferably, the Ti addition amount ranges from 5 to 20 at. %.

<Experiment 3>

To avoid duplication, the portions of the experiment 3 corresponding to the foregoing experiment 2 will not be described below. In the experiment 3, the foundation layer had a Ru-based composition into which Cr was added. The addition amount of Cr to Ru ranged from 0 to 100 at. %. The composition of the plated layer was Fe75Co25 as in the foregoing experiment 2. The experimental results are shown in Table 3.

TABLE 3

| Sample No. | Cr addition amount in foundation layer (at. %) | Easy-axis coercivity Hc (Oe) | Permeability μ' (at 10 MHz) | Crystal structure of foundation layer | Pinhole/ corrosion |
|---|---|---|---|---|---|
| 31 | 0 | 9 | 1650 | hcp | Yes |
| 32 | 2 | 10 | 1580 | hcp | Yes |
| 33 | 5 | 15 | 1520 | hcp | No |
| 34 | 10 | 17 | 1500 | hcp | No |
| 35 | 20 | 21 | 1390 | hcp | No |
| 36 | 30 | 24 | 1020 | hcp | No |
| 37 | 45 | 29 | 850 | hcp-bcc | No |
| 38 | 50 | 32 | 620 | hcp-bcc | No |
| 39 | 55 | 35 | 550 | hcp-bcc | No |
| 40 | 60 | 52 | 450 | bcc | No |
| 41 | 100 | 60 | 320 | bcc | No |

In the item of "crystal structure of foundation layer" in Table 3, "hcp" refers to hexagonal close-packed structure, "bcc" refers to body-centered cubic structure, and "hcp-bcc" refers to a mixture of hexagonal close-packed structure and body-centered cubic structure, as in Table 1.

At first, the occurrence of pinhole and corrosion will be discussed. When the Cr addition amount was less than 5 at. %, either pinhole or corrosion occurred. This may be because the standard electrode potential of the foundation layer was high, and at the same time, the impurity amount of the plated layer was large (Sample Nos. 31 and 32).

When the Cr addition amount was equal to or greater than 5 at. %, on the other hand, both pinhole and corrosion were suppressed. This may be because the standard electrode potential of the foundation layer was low, and at the same time, the impurity amount of the plated layer was small (Sample Nos. 33 to 41).

From the viewpoint of preventing pinhole and corrosion, accordingly, it is understood that the Cr addition amount is preferably equal to or greater than 5 at. %.

Next will be discussed soft magnetic properties such as easy-axis coercivity and permeability. When the Cr addition amount was equal to or less than 55 at. %, the hexagonal close-packed structure (hcp), which is a crystal structure of the noble metal Ru, was predominant in the crystal structure of the foundation layer. Therefore, setting the Cr addition amount equal to or less than 50 at. % with a margin of the Cr addition amount in mind leads to ensuring excellent soft magnetic properties, e.g., the easy-axis coercivity was less than 40 (Oe) and the permeability was greater than 600 (Sample Nos. 31 to 38).

When the Cr addition amount was greater than 50 at. %, on the other hand, the body-centered cubic structure (bcc), which is a crystal structure of the base metal Cr, was predominant in the crystal structure of the foundation layer. This deteriorated soft magnetic properties, e.g., the easy-axis coercivity was greater than 40 (Oe) and the permeability was less than 600 (Sample Nos. 39 to 41).

From the viewpoint of ensuring excellent soft magnetic properties, accordingly, it is understood that the Cr addition amount is preferably equal to or less than 50 at. %.

From the above, it is found that the Cr addition amount preferably ranges from 5 to 50 at. % in order not only to prevent pinhole and corrosion but also to ensure excellent soft magnetic properties. In order to further improve soft magnetic properties, more preferably, the Cr addition amount ranges from 5 to 20 at. %.

<Experiment 4>

To avoid duplication, the portions of the experiment 4 corresponding to the foregoing experiment 2 will not be described below. In the experiment 4, the foundation layer had a Pt-based composition into which Cr was added. The addition amount of Cr to Pt ranged from 0 to 100 at. %. The composition of the plated layer was Fe75Co25 as in the foregoing experiment 2. The experimental results are shown in Table 4.

TABLE 4

| Sample No. | Cr addition amount in foundation layer (at. %) | Easy-axis coercivity Hc (Oe) | Permeability μ' (at 10 MHz) | Crystal structure of foundation layer | Pinhole/ corrosion |
|---|---|---|---|---|---|
| 42 | 0 | 14 | 1650 | fcc | Yes |
| 43 | 2 | 16 | 1580 | fcc | Yes |
| 44 | 5 | 18 | 1520 | fcc | No |
| 45 | 10 | 21 | 1500 | fcc | No |
| 46 | 20 | 25 | 1390 | fcc | No |
| 47 | 30 | 28 | 1020 | fcc | No |
| 48 | 45 | 29 | 850 | fcc-bcc | No |
| 49 | 50 | 35 | 620 | fcc-bcc | No |
| 50 | 55 | 42 | 550 | fcc-bcc | No |
| 51 | 60 | 55 | 420 | bcc | No |
| 52 | 100 | 60 | 320 | bcc | No |

In the item of "crystal structure of foundation layer" in Table 4, "fcc" refers to face-centered cubic structure, "bcc" refers to body-centered cubic structure, and "fcc-bcc" refers to a mixture of face-centered cubic structure and body-centered cubic structure.

At first, the occurrence of pinhole and corrosion will be discussed. When the Cr addition amount was less than 5 at. %, either pinhole or corrosion occurred. This may be because the standard electrode potential of the foundation layer was high, and at the same time, the impurity amount of the plated layer was large (Sample Nos. 42 and 43).

When the Cr addition amount was equal to or greater than 5 at. %, on the other hand, both pinhole and corrosion were suppressed. This may be because the standard electrode potential of the foundation layer was low, and at the same time, the impurity amount of the plated layer was small (Sample Nos. 44 to 52).

From the viewpoint of preventing pinhole and corrosion, accordingly, it is understood that the Cr addition amount is preferably equal to or greater than 5 at. %.

Next will be discussed soft magnetic properties such as easy-axis coercivity and permeability. When the Cr addition amount was equal to or less than 55 at. %, the face-centered cubic structure (fcc), which is a crystal structure of the noble metal Pt, was predominant in the crystal structure of the foundation layer. Therefore, setting the Cr addition amount equal to or less than 50 at. % with a margin of the Cr addition amount in mind leads to ensuring excellent soft magnetic properties, e.g., the easy-axis coercivity was less than 40 (Oe) and the permeability was greater than 600 (Sample Nos. 42 to 49).

From the viewpoint of ensuring excellent soft magnetic properties, accordingly, it is understood that the Cr addition amount is preferably equal to or less than 50 at. %.

From the above, it is found that the Cr addition amount preferably ranges from 5 to 50 at. % in order not only to prevent pinhole and corrosion but also to ensure excellent soft magnetic properties. In order to further improve soft magnetic properties, more preferably, the Cr addition amount ranges from 5 to 20 at. %.

<Experiment 5>

To avoid duplication, the portions of the experiment 5 corresponding to the foregoing experiment 2 will not be described below. In the experiment 5, the foundation layer had a Pt-based composition into which Ti was added. The addition amount of Ti to Pt ranged from 0 to 100 at. %. The composition of the plated layer was Fe75Co25 as in the foregoing experiment 2. The experimental results are shown in Table 5.

TABLE 5

| Sample No. | Ti addition amount in foundation layer (at. %) | Easy-axis coercivity Hc (Oe) | Permeability µ' (at 10 MHz) | Crystal structure of foundation layer | Pinhole/corrosion |
|---|---|---|---|---|---|
| 53 | 0 | 9 | 1650 | fcc | Yes |
| 54 | 2 | 16 | 1580 | fcc | Yes |
| 55 | 5 | 18 | 1520 | fcc | No |
| 56 | 10 | 19 | 1520 | fcc | No |
| 57 | 20 | 24 | 1415 | fcc | No |
| 58 | 30 | 26 | 1240 | fcc | No |
| 59 | 45 | 28 | 900 | fcc-bcc | No |
| 60 | 50 | 30 | 660 | fcc-bcc | No |
| 61 | 55 | 45 | 490 | fcc-bcc | No |
| 62 | 60 | 55 | 420 | hcp | No |
| 63 | 100 | 62 | 300 | hcp | No |

In the item of "crystal structure of foundation layer" in Table 5, "hcp" refers to hexagonal close-packed structure, "fcc" refers to face-centered cubic structure, "bcc" refers to body-centered cubic structure, and "fcc-bcc" refers to a mixture of face-centered cubic structure and body-centered cubic structure.

At first, the occurrence of pinhole and corrosion will be discussed. When the Ti addition amount was less than 5 at. %, either pinhole or corrosion occurred. This may be because the standard electrode potential of the foundation layer was high, and at the same time, the impurity amount of the plated layer was large (Sample Nos. 53 and 54).

When the Ti addition amount was equal to or greater than 5 at. %, on the other hand, both pinhole and corrosion were suppressed. This may be because the standard electrode potential of the foundation layer was low, and at the same time, the impurity amount of the plated layer was small (Sample Nos. 55 to 63).

From the viewpoint of preventing pinhole and corrosion, accordingly, it is understood that the Ti addition amount is preferably equal to or greater than 5 at. %.

Next will be discussed soft magnetic properties such as easy-axis coercivity and permeability. When the Ti addition amount was equal to or less than 50 at. %, excellent soft magnetic properties were ensured, e.g., the easy-axis coercivity was less than 40 (Oe) and the permeability was greater than 600 (Sample Nos. 53 to 60).

When the Ti addition amount was greater than 50 at. %, on the other hand, soft magnetic properties deteriorated, e.g., the easy-axis coercivity was greater than 40 (Oe) and the permeability was less than 600 (Sample Nos. 61 to 63).

From the viewpoint of ensuring excellent soft magnetic properties, accordingly, it is understood that the Ti addition amount is preferably equal to or less than 50 at. %.

From the above, it is found that the Ti addition amount preferably ranges from 5 to 50 at. % in order not only to prevent pinhole and corrosion but also to ensure excellent soft magnetic properties. In order to further improve soft magnetic properties, more preferably, the Ti addition amount ranges from 5 to 20 at. %.

<Experiment 6>

To avoid duplication, the portions of the experiment 6 corresponding to the foregoing experiment 2 will not be described below. In the experiment 6, the foundation layer had a Ru-based composition into which Ti was added. The addition amount of Ti to Ru ranged from 0 to 100 at. %. The composition of the plated layer was Fe75Co25 as in the foregoing experiment 2. The experimental results are shown in Table 6.

TABLE 6

| Sample No. | Ti addition amount in foundation layer (at. %) | Easy-axis coercivity Hc (Oe) | Permeability µ' (at 10 MHz) | Crystal structure of foundation layer | Pinhole/corrosion |
|---|---|---|---|---|---|
| 64 | 0 | 9 | 1650 | hcp | Yes |
| 65 | 2 | 9 | 1650 | hcp | Yes |
| 66 | 5 | 12 | 1520 | hcp | No |
| 67 | 10 | 15 | 1500 | hcp | No |
| 68 | 20 | 18 | 1390 | hcp | No |
| 69 | 30 | 25 | 1020 | hcp | No |
| 70 | 45 | 29 | 850 | hcp | No |
| 71 | 50 | 35 | 600 | hcp | No |
| 72 | 55 | 39 | 520 | hcp | No |
| 73 | 60 | 56 | 400 | hcp | No |
| 74 | 100 | 62 | 300 | hcp | No |

At first, the occurrence of pinhole and corrosion will be discussed. When the Ti addition amount was less than 5 at. %, either pinhole or corrosion occurred. This may be because the standard electrode potential of the foundation layer was high, and at the same time, the impurity amount of the plated layer was large (Sample Nos. 64 and 65).

When the Ti addition amount was equal to or greater than 5 at. %, on the other hand, both pinhole and corrosion were suppressed. This may be because the standard electrode potential of the foundation layer was low, and at the same time, the impurity amount of the plated layer was small (Sample Nos. 66 to 74).

From the viewpoint of preventing pinhole and corrosion, accordingly, it is understood that the Ti addition amount is preferably equal to or greater than 5 at. %.

Next will be discussed soft magnetic properties such as easy-axis coercivity and permeability. When the Ti addition amount was equal to or less than 50 at. %, excellent soft magnetic properties were ensured, e.g., the easy-axis coercivity was less than 40 (Oe) and the permeability was equal to or greater than 600 (Sample Nos. 64 to 71).

When the Ti addition amount was greater than 50 at. %, on the other hand, soft magnetic properties deteriorated, e.g., the easy-axis coercivity was greater than 40 (Oe) and the permeability was less than 600 (Sample Nos. 72 to 74).

From the viewpoint of ensuring excellent soft magnetic properties, accordingly, it is understood that the Ti addition amount is preferably equal to or less than 50 at. %.

From the above, it is found that the Ti addition amount preferably ranges from 5 to 50 at. % in order not only to prevent pinhole and corrosion but also to ensure excellent soft magnetic properties. In order to further improve soft magnetic properties, more preferably, the Ti addition amount ranges from 5 to 20 at. %.

Figure 8:
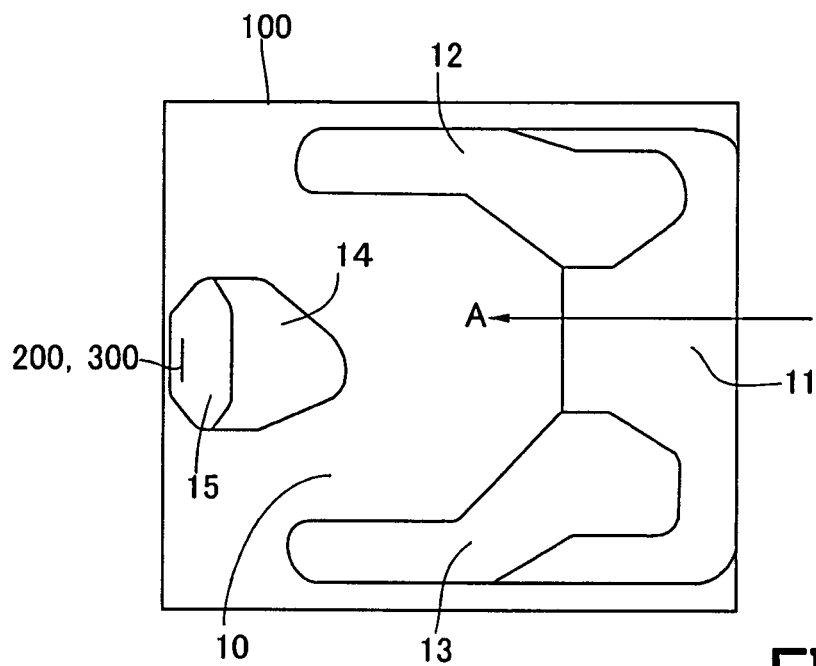
FIG. 8 is a plan view showing a medium-facing surface side of a thin-film magnetic head according to one embodiment of the present invention.
Figure 9:
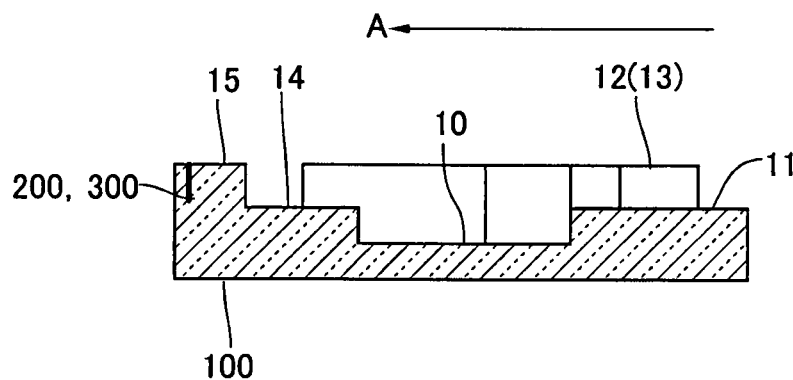
FIG. 9 is a sectional front view of the thin-film magnetic head shown in FIG. 8.
Figure 10:
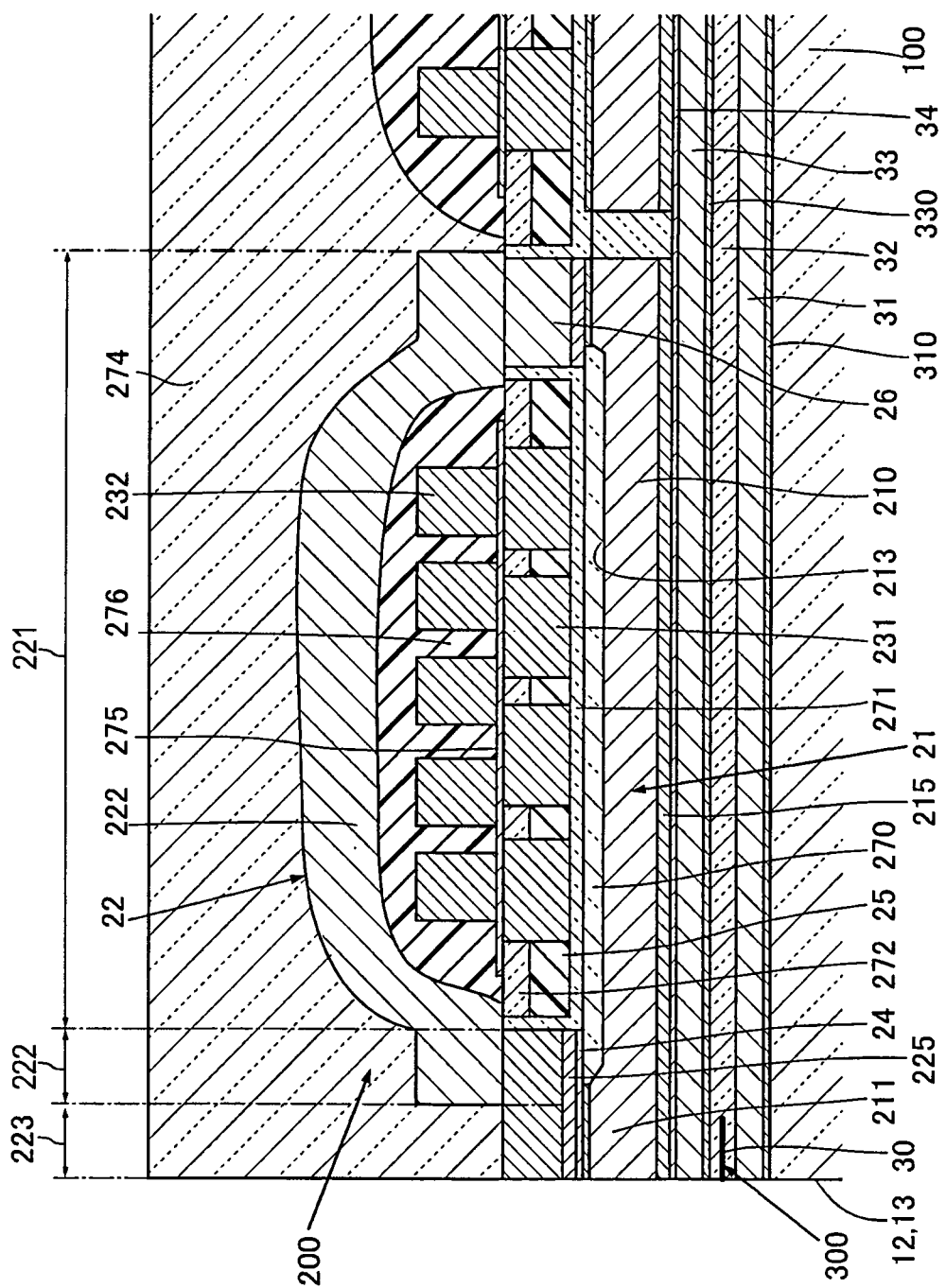
FIG. 10 is an enlarged cross-sectional view showing an element portion of the thin-film magnetic head shown in FIGS. 8 and 9.

FIG. 8 is a plan view showing a medium-facing surface side of a thin-film magnetic head according to one embodiment of the present invention, FIG. 9 is a sectional front view of the thin-film magnetic head shown in FIG. 8, and FIG. 10 is an enlarged cross-sectional view showing an element portion of the thin-film magnetic head shown in FIGS. 8 and 9. In these drawings, dimensions and proportions are exaggerated for purposes of illustration.

Referring first to FIGS. 8 and 9, a slider substrate 100 is made of, for example, a ceramic material such as AlTiC ($Al_2O_3.TiC$) and has a geometric shape on its medium-facing surface for controlling flying characteristics. In the illustrated embodiment, as a typical example of such a geometric shape, the slider substrate 100 has a base surface 10 with a first stage 11, a second stage 12, a third stage 13, a fourth stage 14 and a fifth stage 15. The base surface 10 serves as a negative pressure generation portion with respect to an air flow direction indicated by an arrow A, wherein the second stage 12 and the third stage 13 constitute a step-like air bearing which rises from the first stage 11. The surface of the second stage 12 and the surface of the third stage 13 form an ABS.

The fourth stage 14 rises from the base surface 10 and the fifth stage 15 rises from the fourth stage 14 in a step-like manner. The fifth stage 15 is provided with a write element 200 and a read element 300.

Referring next to FIG. 10, the read element 300 includes a MR element 30, a lower shield film 31 and an upper shield film 33. In the illustrated embodiment, the MR element 30 is a CIP-GMR element. This MR element 30, which is a CIP-GMR element, is disposed in an insulating gap film 32 to have an insulating gap between the lower surface of the MR element and the lower shield film 31 and an insulating gap between the upper surface of the MR element and the upper shield film 33.

Unlike in the illustrated embodiment, the MR element 30 may be a CPP-TMR or CPP-GMR element. This MR element 30, which is a CPP-TMR or CPP-GMR element, is disposed such that no insulating gap is provided between the lower surface of the MR element and the lower shield film 31 and no insulating gap is provided between the upper surface of the MR element and the upper shield film 33.

The write element 200 includes a lower magnetic film 21, an upper magnetic film 22, thin-film coils 231, 232, and a write gap film 24. The lower magnetic film 21 has a lower yoke portion 210 and a lower pole portion 211. The lower pole portion 211 projects from one end of the lower yoke portion 210 on the side facing a recording medium, i.e., on the side of the ABS 12, 13. The lower pole portion 211 is disposed on an insulating film 34 adjacent to the upper shield film 33 with a foundation film 215 interposed therebetween. The numeral 213 designates a recess provided in the lower yoke portion 210, and the numeral 270 designates an insulating film filling the recess 213.

The upper magnetic film 22 has an upper yoke portion 221 and an upper pole portion (222, 223). Although not clearly distinguishable from each other in the magnetic circuit, the yoke portion and pole portion can be distinguished from each other based on the area size. More specifically, the yoke portion refers to a large area portion, while the pole portion refers to a small-area portion tapered away from the large area portion. The upper magnetic film 22 is covered with an insulating film 274 such as of alumina.

The upper yoke portion 221 is spaced apart from the lower yoke portion 210 but magnetically coupled with the lower yoke portion 210 by a rear coupling portion 26 that is on the rear side in relation to the side of ABS 12, 13 facing a recording medium. The thin-film coils 231, 232 are electrically insulated by insulating films 25, 271, 272, 275, 276 lying between the lower yoke portion 210 and the upper yoke portion 221. The insulating films 25, 271, 272, 275, 276 may be an organic insulating film, an inorganic insulating film or a combination thereof.

The upper pole portion (222, 223) includes an upper pole end portion 223 and an upper pole rear portion 222 and is opposed to the lower pole portion 211 with a foundation film 225 and the write gap film 24 interposed therebetween.

In the above thin-film magnetic head, the structure of the magnetic film 5 shown in FIG. 1 is applicable to the lower pole portion 211 or the upper pole end portion 223 of the write element 200. For example, the lower pole portion 211 and the foundation film 215 may correspond to the plated layer 3 and the foundation layer 2, respectively, of the magnetic film 5 shown in FIG. 1. The upper pole end portion 223 and the foundation film 225 may also correspond to the plated layer 3 and the foundation layer 2, respectively, of the magnetic film 5 shown in FIG. 1. The performance of the write element can be improved by thus adopting the structure of the magnetic film 5 shown in FIG. 1 for the lower pole portion 211 or the upper pole end portion 223 of the write element 200.

The structure of the magnetic film 5 shown in FIG. 1 is also applicable to the lower shield film 31 or the upper shield film 33 of the read element 300. For example, the lower shield film 31 and its foundation film 310 may correspond to the plated layer 3 and the foundation layer 2, respectively, of the magnetic film 5 shown in FIG. 1. The upper shield film 33 and its foundation film 330 may also correspond to the plated layer 3 and the foundation layer 2, respectively, of the magnetic film 5 shown in FIG. 1. The performance of the read element can be improved by thus adopting the structure of the magnetic film 5 shown in FIG. 1 for the lower shield film 31 or the upper shield film 33 of the read element 300 to thereby increase the permeability.

Although the illustrated thin-film magnetic head is a thin-film magnetic head for longitudinal magnetic recording, the magnetic film 5 shown in FIG. 1 is not limited thereto but is also applicable to a thin-film magnetic head for perpendicular magnetic recording.

While the present invention has been particularly shown and described with reference to embodiments thereof, it will be understood by those skilled in the art that various changes in form and detail may be made therein without departing from the spirit, scope and teaching of the invention.

What is claimed is:
1. A thin-film magnetic head, comprising:
   a write element;
   a read element, and;
   a slider supporting said write element and said read element, wherein
   at least one of said write element and said read element includes a magnetic film including a foundation layer consisting of an alloy of a noble metal element and a base metal element, and a plated layer of a magnetic material substantially consisting of CoFe or NiFe formed on said foundation layer,
   wherein said foundation layer is selected from a combination group of (Ru, Ti),
   wherein a total amount of said base metal element in said foundation layer ranges from 5 to 20 atomic %, and
   wherein said foundation layer has a lower standard electrode potential than a foundation layer of only said noble metal element to suppress an occurrence of pinholes in said plated layer when said plated layer is formed on said foundation layer.

2. The thin-film magnetic head of claim 1, further comprising:
a second layer of a magnetic material formed directly on said plated layer, wherein said plated layer is formed directly on said foundation layer.

* * * * *